United States Patent [19]
Kiencke et al.

[11] 3,928,797
[45] Dec. 23, 1975

[54] CIRCUIT FOR CONVERTING A FREQUENCY INTO A BINARY NUMBER

[75] Inventors: Uwe Kiencke, Moglingen; Günter Hünig, Braunschweig, both of Germany

[73] Assignee: Robert Bosch G.m.b.H., Stuttgart, Germany

[22] Filed: June 25, 1974

[21] Appl. No.: 482,831

[30] Foreign Application Priority Data
July 14, 1973  Germany............................ 2336015

[52] U.S. Cl................................. 324/78 D; 324/162
[51] Int. Cl.$^2$......................................... G01R 23/02
[58] Field of Search................. 324/78 D, 79 D, 162

[56] References Cited
UNITED STATES PATENTS

| | | | |
|---|---|---|---|
| 3,263,064 | 7/1966 | Lindars............................ | 324/78 D |
| 3,486,007 | 12/1969 | Jacobson........................ | 324/78 D |
| 3,673,391 | 6/1972 | Lougheed........................ | 324/78 D |
| 3,801,906 | 4/1974 | Harris.............................. | 324/78 D |

*Primary Examiner*—Alfred E. Smith
*Assistant Examiner*—Michael J. Tokar
*Attorney, Agent, or Firm*—William R. Woodward

[57] ABSTRACT

The frequency of a pulse sequence, such as pulses produced by a tachogenerator to measure the rate of rotation of a vehicle wheel or an engine shaft, is measured with a short response time by a circuit which is provided with pulses of the frequency to be measured and with timing pulses of a frequency much higher than the highest frequency to be measured. A downwards counter is reset to a maximum count value by a first pulse of the frequency to be measured and is caused to count down at a count value that varies hyperbolically with respect to time. The count result at the moment of the next pulse of the frequency to be measured gives the measurement of frequency as a binary number. During an initial portion of the count period, the count output for practical reasons is not hyperbolic. Therefore, if the final count is equal to or greater than half the initial maximum number, the scale is automatically shifted to count over two cycles of the frequency to be measured with reference to a different hyperbola with twice the slope at the same values of count, compared to the hyperbola used for the first measurement. Measurements are continually repeated, so that the output binary number changes as the frequency measured changes, with a short response time, even for low frequencies.

8 Claims, 4 Drawing Figures

CIRCUIT FOR CONVERTING A FREQUENCY INTO A BINARY NUMBER

The invention relates to a circuit for converting a frequency into a binary number, particularly for use with a tachogenerator to indicate the speed of rotation of a shaft or the speed of movement of a vehicle. More particularly, the invention concerns such a circuit operating with inputs respectively of a frequency to be measured and of a fixed reference frequency, generally denoted as a clock frequency.

Converters for converting the frequency of an input into a binary number are used to advantage in electronic circuits when data available in digital form or measurements in binary code form are to be further processed or are to be represented in an indicator device.

A circuit is known for converting a frequency into a decimal number in which the input pulses whose frequency is to be measured are counted over an adjustable time interval. In that circuit, a sequence of input pulses must precede an output signal. For many applications in frequency or speed measurement, the response time of such a system is too long. By a shortening of the adjustable time interval, it is possible to reduce the response time, but at the same time the measurable frequency range is reduced thereby. A further disadvantage is the low sensitivity of such a circuit with respect to rapid changes in frequency.

It is an object of the present invention to provide a circuit for converting a frequency into a binary number having a short response time, by which even low frequencies can be measured without great delay.

Subject Matter of the Present Invention

Briefly, a counting means with a hyperbolic counting characteristic with respect to time, which hyperbolic characteristic, however, is approximated by the sides of a polygon (i.e. connected straight lines) is arranged to count downward so as to maintain a proportionality between frequency and binary count output. The desired counting characteristic is obtained by continuously providing the binary count output to a decoding stage with a hyperbolic wired program and utilizing the output signal of the decoding stage as a multiplying factor for one input frequency of a frequency reducing multiplier of which provides the counting pulses for the downward counter.

The invention is based upon the concept that the desired proportionality between the frequency $f$ and the binary count output $Z$ is obtainable by the hyperbolic relation between the frequency $f$ and the one cycle period $T$ expressed in the formula $$f = \frac{1}{T}.$$

This interdependence of the binary count output and the time period requires a hyperbolic counting characteristic. The counting frequency, which is the gradient with respect to time of the count output, accordingly falls with increasing duration of count. At the beginning, of course a very high counting frequency is needed and, since the limit $$t \rightarrow 0, Z \rightarrow \infty, \frac{\Delta Z}{\Delta T} \rightarrow \infty$$

cannot actually be realized, the maximum counting frequency is determined by the nature of the counter that is used.

The hyperbolic characteristic of the time-dependent count value $Z$, which is to say the nonlinear counting frequency during the counting process, is approximated by the sides of a polygon, i.e., by connected straight lines, the transistions from one straight line segment to another being preferably derived from the count $Z$ and not from the time $t$.

It is possible to avoid having to deal with an unrealizably high initial counting frequency by delaying the beginning of the count a little. In this way the maximum count magnitude can be held for a short delay until it coincides with the hyperbola. For an exact aand definite determination of the actual beginning value of the downward count, it is possible also to count down to this value at a low counting frequency during the initial delay period rather than to hold the count stationary during that period. Delaying the beginning of the count, however, produces a time duration limit, that corresponds to a maximum frequency. For frequencies involving a smaller oscillation period, this operation is therefore no longer suitable.

An extension of the counting range for frequencies involving shorter cycle periods than $T_0$ can be provided by a hyperbolic count extending over two cycles of the frequency to be measured. Switching over between the two kinds of counting (i.e., between the single and double period) is thus dependent upon the limit period above mentioned. As a further criterion for switching over to counting for two periods of the input signal, it may be useful to consider the approximation errors that arise from the polygonal approximation of a hyperbola. The approximation error becomes more noticeable at small periods.

When the counting is done for two periods of the input signal, a new hyperbola is to be followed as the counting characteristic. From the relation $Z = 2/t$ it follows that the new hyperbola has a slope that is twice as steep.

The manner of operation of the invention is further explained by means of a counting diagram and a circuit example in the accompanying drawings, in which.

Figure 1:
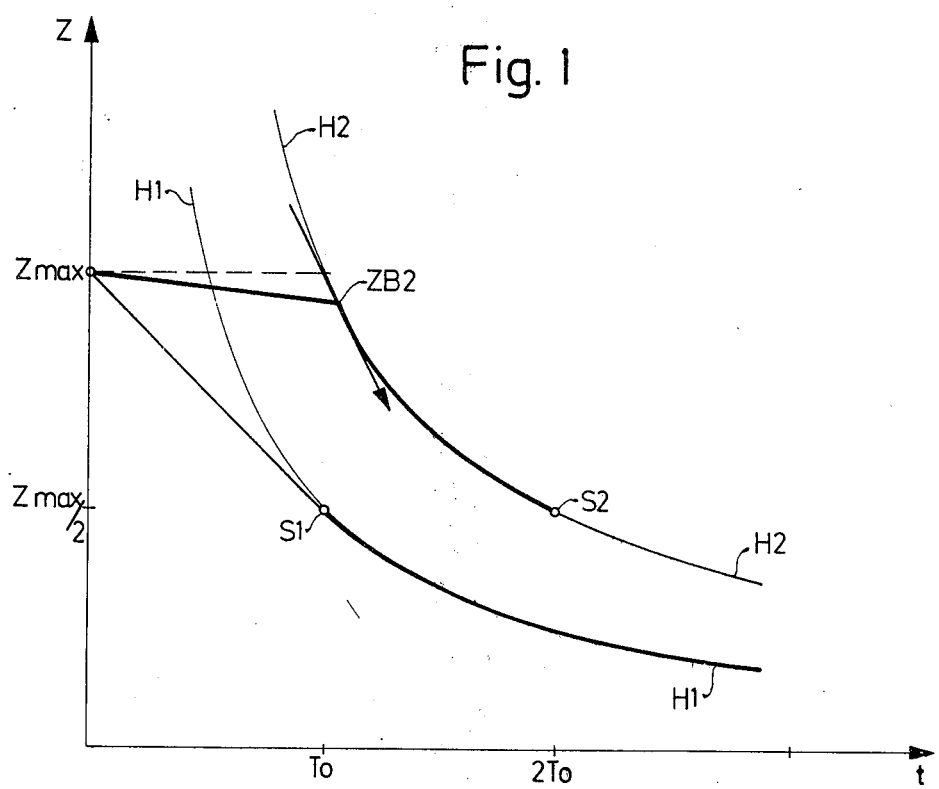
FIG. 1 shows the course of the two hyperbolae in a graph plotting time against count output.

FIG. 1 should first be considered. The two hyperbolae H1 and H2 of which the equations are $Z = 1/t$ and $Z = 2/t$, respectively are there shown on the same graph. If initially a frequency $f1$ with a long cycle is to be counted out by the counter, the counter jumps to the value Zmax in response to an input $f1$ pulse and counts downward therefrom with a counting frequency so chosen that the count output touches the hyperbola H1 at the point S1. From this point on, the count output then follows this hyperbola H1 until subsequently a renewed $f1$ pulse is applied to the circuit. The final value of the count is then proportional to the input frequency. If the cycle period is reduced, which is to say that the frequency increases, the final count gradually approaches the value S1 on the hyperbola H1. If the count is stopped ever so little before the value S1 is reached, that is before the time $T_0$, the counting operation is switched over to the second hypperbola H2. The pulse that terminates the count above the point S1 produces a jump of the count back to the value Zmax for the next counting operation, followed by a counting down at a lower rate down to the point ZB2 on the hyperbola H2. At the point ZB2, the maximum counting rate sets in and the count follows the hyperbola in the direction of diminishing slope down to the point S2. Because of the double slope of the hyperbola H2 compared to the hyperbola H1, the point S2 is at the same count value, for example ½ Zmax, as the point S1, but at twice the value of time on the time axis. It is seen that the same value of count is obtained on the hyperbola H1 at the time $T = 1 \cdot T_0$ and on the hyperbola H2 at the time $T = 2 \cdot T_0$. Accordingly, counting on the hyperbola H2 can be done by counting double periods in order to obtain the same value of count as by a count on the hyperbola H1 after a single period. An accurate count result is obtained on this second hyperbola by going from point ZB2 down to point S2. Above the point ZB2, the count output is not on the hyperbola and there is an error. Accordingly, in the illustrative embodiment here described, unless a previous measurement has indicated that the hyperbola H2 was used, counting over a single $f1$ period first proceeds on the hyperbola H1 on the assumption the final count output Z will be smaller than ½ Zmax. If the final count is higher than ½Zmax, the measurement is postponed and a second count on the hyperbola H2, over two $f1$ periods, is carried out. In principle, this measurement process can conceivably be performed with more than two counting periods. In such a case, the slope of the additional hyperbola byperbolae must be increased correspondingly to the number of periods by which the count is carried out. The counting range over each individual hyperbola will be progressively smaller, which is to say that the segment S2–ZB2 shown on the hyperbola H2 becomes smaller with increasing slope of the hyperbola, but it can accordingly be more closely approximated with the same number of polygon sides.

Figure 2:
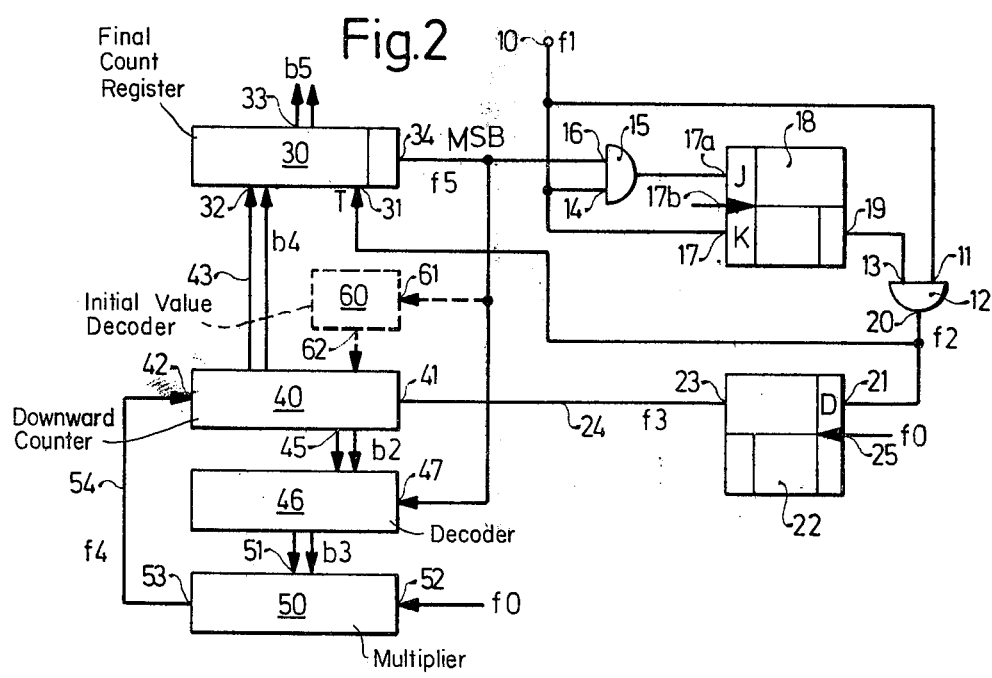
FIG. 2 is a diagram of a circuit for converting a frequency into a binary number.

FIG. 2 shows an illustrative circuit embodying the above-described measurement principle.

A terminal 10 provides an input to the circuit for the frequency $f1$, which is the frequency to be measured in terms of a binary number. This input terminal is connected to a first input 11 of a first AND-gate 12 and to a first input 14 of a second AND-gate 15, as well as to the K input of the J-K flipflop circuit 18. A pulse input 17a of the J-K flipflop circuit 18 is connected with the output of the AND-gate 15.

J-K flipflop circuits, D flipflop circuits, as well as AND-gate and OR-gate circuits are described in "Digital Electronics in Measurements and Data Processing" by Dokter and Steinhauer, published in Philips textbook series, pages 11–21. Pages 46 and 47 of the same text show a forward counting circuit.

The inverting output 19 of the J-K flipflop circuit 18 is connected with the second input 13 of the AND-gate 12. The output 20 of the latter is connected both to the pulse input 21 of a D-flipflop circuit 22 and the timing pulse input 31 of a final count register 30*. A connection 24 runs from the noninverting output 23 of the D-flipflop circuit 22 over to the reset input 41 of a downwards counter 40. The counter 40 is connected over conductors 45 to a decoder 46 * and the latter is in turn connected over the conductors 51 to a multiplier 50 (for example TI SN 7497). A timing frequency or clock frequency f0 is supplied to an input 52 of the multiplier 50, to a timing input 25 of the D-flipflop circuit 22 and to a timing input 17b of the J-K flipflop circuit 18. A connection 54 connects the output 53 of the multiplier 50 with a counting input 42 of the downward counter 40. From the latter, in addition to the connections 45 to the decoder 46, there are also connections 43 to inputs 32 of the final count register 30. The most significant bit (MSB) position of the final count register 30 is connected to the second input 16 of the second AND-gate 15 and to an input 47 of the decoder 46. The outputs 33 of the final count register 30 form the output of the entire circuit, furnishing a binary number into which the input frequency has been converted.

\* This part is available for example by Texas Instruments (TI) SN 49702 N
\*\* for example TI SN 54/74190
\*\*\* for example Intel 1702 (programmable ROM)

In order to provide different maximum count values for the counting operation by one or two period durations of the input frequency, an initial value decoder 60 designated in dashed lines is provided having an input 61 connected to the output 34 of the final count register 30 and an output 62 connected to the downward counter 40. Both the decoder 46 and the initial value decoder 60 can be constituted of logic gates or, alternatively, these can be provided in the form of an addressable store of the ROM (read-only memory) type.
\*\*for example Intel 1702 (programmable ROM)

In order to distinguish sequential processing from parallel processing of pulses and binary numbers respectively, different kinds of connections are shown in FIG. 2. The double lines designate parallel processing on a word basis, whereas the single lines indicate connection paths for pulse sequences. For distinguishing the kinds of signals, the following designations are made in FIG. 2: $f0$ for the clock frequency (reference frequency), $f1$ for the input frequency (frequency to be measured and converted into a binary number), $f2$ for the frequency at the output of the first AND-gate 12, $f3$ for the frequency of the output of the D-flipflop circuit 22, $f4$ for the frequency appearing at the output 53 of the multiplier 50 and, finally, $f5$ for the frequency of the MSB signal. The pulse groups that are processed in parallel are likewise given distinguishing designations: $b2$ for the output of the downwards counter 40, $b3$ for the output of the decoder 46, $b4$ $d4$ for the output of the downward counter 40 supplied as input to the final count register and $b5$ for the output of the final count register 30.

Operation of the Circuit of FIG. 2.

The pulses of input frequency f1 have a pulse width equal to a timing pulse ($f0$) period and are synchronized with the timing pulses. Synchronizing circuits for such preprocessing of the input frequency are well known and are therefore not described here. The clock frequency $f0$ is much higher than the highest frequency of the range of $f1$ measurement, and may conveniently be the frequency of the maximum counting rate of the counter 40.

The momentary value of the count existing in the downward counter 40 is transferred over the connections 43 into the final count register 30 every time a pulse is provided at the timing input 31 of the register 30. For at least one period of the input frequency $f1$, the number registered in the register 30 remains constant and likewise the most significant bit (MSB) of that number. When the MSB is zero, the arrival of every $f1$ input pulse at the AND-gate 12 will result in the presence of an L signal (sometimes referred to as a 1) at both the inputs 11 and 13 of this AND-gate, resulting in the input pulse switched through to the output 20. The count in the downward counter 40 is then transferred to the register 30 and then reset to the maximum value Zmax with the next timing ($f0$) pulse.

If the cycle period of the two preceding $f1$ input pulses was smaller than $T_0$, however, the MSB would be 1 ("set" condition) which is transmitted over the connection to the decoder 46 to require a shift to the hyperbolic characteristic represented by the hyperbola H2 rather than H1. At the same time the AND-gate 15 produces an L signal at the next input pulse which switches over the J-K flipflop 18 and thereby blocks the AND-gate 12. The momentary count of the downward counter is not transferred. The downward counter is likewise not reset and must await resetting by the arrival of a new input pulse of frequency $f1$ that reinverts the output signal of the J-K flipflop circuit 18, as the result of which an L signal is produced at the output 20 of the AND-gate 12. The counting operation can then begin anew.

Whenever the count result Z is less then ½Zmax, on either hyperbola, the next count proceeds over a single period of $f1$, whereas if Z is greater than ½Zmax, the next count proceeds over two periods. The count result at the time of the pulse that stops the count in each case represents a value that is proportional to the input frequency, the proportionality factor depending on the scale shift determined by the previous MSB.

If two different maximum count values are used, these can be provided to the downward counter 40 by means of the initial value decoder 60 in accordance with the value of the most significant bit of the final count register 30. Preferably the maximum count value for counting over a single period should be chosen lower than in the case of counting over two periods.

The downward counting rate is in accordance with pulses of frequency $F4$ provided over the connection 54 from the output 53 of the multiplier 50 to the input 42 of the downward counter 40. The count begins with the counter 40 set to Zmax. The decoder 46 keeps the counting pulse rate $f4$ initially at a steady rate, corresponding to the line Zmax − S1, assuming now that the MSB in register 30 is zero. After the hyperbola is reached, the decoder output 46 begins to vary the input 51 to the multiplier 50. In the case of the hyperbola H1, this involves a progressively slowing down of the count, which means a gradual reduction of the multiplication factor provided to the input 51. In this particular illustration the initial counting date corresponds to a line tangent to the hyperbola and the counting rate is not changed until the next line (not shown) of the polygon approximation is reached.

As explained above in connection with the circuit of the flipflops 18 and 22 and the gates 12 and 15, if the MSB in register 30 is or becomes 1, operations are transferred to refer to the hyperbola H2. When the count has proceeded downward from Zmax to the value ZB2, the decoder jumps the multiplying factor provided to the input 51 to the maximum count rate indicated in FIG. 1 by the arrow passing through the point ZB2 and then gradually reduces the multiplying factor in accordance with the progress of the count at a rate corresponding to the hyperbola H2. As pointed out before, the slope of the hyperbola H2 is half that of the hyperbola H1 for the same value as the downward counter, so that the switching of the hyperbolic characteristic provided by the decoder 46 between one hyperbola and the other is relatively simple.

Figure 3:
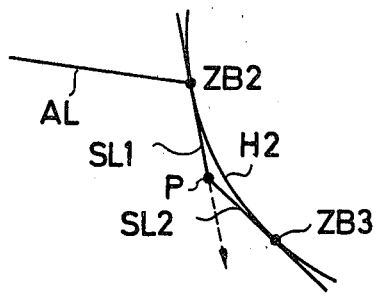
FIG. 3 is an elaborated detail view of part of FIG. 1.

For consideration of the constitution in manner of operation of the decoder 46 of FIG. 2 it is desirable first to consider FIG. 3 which is a detail view of a portion of the graph of FIG. 1 in the neighborhood of the point ZB2 on the hyperbola H2.

As mentioned in connection with FIG. 2, the arrow passing through the point ZB2 has a slope corresponding to the maximum downward counting rate of the counter 40. The arrow of FIG. 2 corresponds to the straight line SL1 in FIG. 3, which is prolonged in dashed lines to an arrowhead to indicate this correspondence. It is convenient to set the maximum downward counting rate of the counter 40 at the pulse rate of the pulses of frequency $f0$. Of course this counting rate could be at some lower rate if that were for some reason desired.

Next, the relation must be established between the maximum counting rate and the counting rate represented by the straight line from the point Zmax on the Z axis and the point S1 in FIG. 1. For example the counting rate of this line leading to the point S1 and meeting the hyperbola H1 there may be two-thirds of the maximum downward counting rate indicated by the arrow passing through ZB2 of FIG. 1. This counting rate is readily produced by suppressing one pulse out of every three pulses of the frequency $f0$. In FIG. 1 the line Zmax-S1 is at 45° to the axes of the graph and is tangent to the vertex of the hyperbola H1. Its downward slope is 1 (disregarding the negative sign for downward directions that would be mathematically conventional, since here only downward counting slopes are considered). The slope of the arrow through ZB 2, and hence of the line SL1 in FIG. 3 is, in these terms, 1.5, since the downward counting rate here is 50% greater than for the line Zmax−Sl.

The point ZB2 where the line SL1 of slope 1.5 is tangent to the hyperbola H2 is found by a mathematical analysis to be at the point of the graph where $Z = 86.6\%$ Zmax and $$t = \frac{2\sqrt{3}}{3} T_0 = 1.154\, T_0.$$

This requires a counting rate for the approach line AL extending from the point on the Z axis at the value Zmax to the point ZB2 that is 8.48% of the maximum counting rate $f0$, slightly more than one-twelfth of $f0$. This may be produced by suppressing every twelfth pulse of the frequency $f0$ except that the suppression of the twelfth pulse is omitted after every 55 cycles of suppressing the twelfth pulse. Logic for generating the pulse rate for the line AL in this matter is readily devisable for incorporation in the multiplier 50.

In order to make the counting rate follow the hyperbola H2 from the point ZB2 downward, the counting rate must gradually be reduced. This may be approximated with relatively small error by changing the counting rate at various times, as the count is reduced, by a small amount, thus producing a series of straight lines describing a portion of a polygon the sides of which are tangent to the hyperbola. Other possibilities of approximation would be sides of a polygon, formed by a series of chords of the curve, placing the vertices of the polygon on the hyperbola. In order to provide a minimum deviation by using a minimum number of straight lines, a series of chords intersecting just outside the hyperbola (the word outside meaning on the convex side of the curve) could be used to approximate the hyperbola. The method of approximation illustrated in FIG. 3, using lines tangent to the hyperbola, is accurate enough for practical purposes and, of course, the accuracy of this method can be increased by using more lines tangent to the hyperbola at points respectively closely together.

To illustrate the method by reference to FIG. 3, the point ZB3 is shown at which the line SL2 is tangent having the slope 1, which is the same slope as the line Zmax-S1 in FIG. 1 and corresponds to the counting rate $\frac{2}{3} f0$. The coordinates of ZB3, which is the vertex of the hyperbola H2, are 70.6% Zmax for the count value and $t = T_0 \sqrt{2} = 1.414 T_0$ for the time. It is desired to switch the counting rate from $f0$ to $\frac{2}{3} f0$ at the point $P$ where the lines SL1 and SL2 intersect, so that the count will be brought to the hyperbola at point ZB3.

Normalizing the scale units of the graph by letting Zmax = 1 and $2T_0 = 1$, there is obtained for the equations of the lines SL1 and SL2, respectively, the following two equations:
$$3x + 2y = 2\sqrt{3}$$
$$x + y = \sqrt{2}$$

Solving for the intersection of these lines one obtains the coordinates $x = 2\sqrt{3} - 2\sqrt{2}$ and $y = 3\sqrt{2} - 2\sqrt{3}$. Converting the normalized units back into Zmax and $T_0$ get for the coordinates of the point $P$ a count value $V = 77.8\%$ Zmax and a time $p = 1.272 T_0$.

The rest of the hyperbola can be similarly approximated by other tangent straight lines and the points of intersection of the tangents similarly determined in terms of the count value and the time.

The decoder 46 is preferably operated in response to the count in the counter 40, so as to make it unnecessary to have an additional counter to count off periods of time in response to the frequency $f0$. Consequently the decoder 46 will change the input 51 of the multiplier 50 whenever a point like point P is reached in response to the value of the count in which the point P corresponds, and the change made to the input 51 will be a change to the output 53 of the multiplier 50 to change from the slope of the upper line meeting at the point to the slope of the lower line. In the case of the point P on FIG. 3 that is a change of the maximum counting rate $f0$ to the rate $\frac{2}{3} f0$. The following of the curve H1 below the point S1 (FIG. 1) by the count of 40 is similarly effected by reducing the counting rate from time to time so that the actual counting characteristic approximates the hyperbola H1 by a series of lines tangent to hyperbola H1, the changeover from one counting rate to another being made at the values of count at the respective intersection points of these tangent lines.

In actual practice the downward slope of the approach line AL or the hyperbola H2 (FIG. 3) can be reduced to a negligible value so that the line is substantially horizontal. In this case the point ZB2 is established at the count value Zmax − 1 and is reached at $t = T_0$ or, if preferred, one cycle of the frequency $f0$ following $t = T_0$. The countdown rate of the line AL then becomes $1/T_0$, and the maximum countdown rate which is established immediately reaching the ZB2 becomes twice the slope of the line SL2. In other words the countdown rate for the line Zmax − S1 of FIG. 1 now becomes $\frac{1}{2} f0$, because the maximum countdown rate $f0$ now associated with a somewhat steeper part of the hyperbola H2. In this case it may be desirable to take a better approximation of the upper part of the hyperbola H2 than would be accomplished by going directly from the line of maximum slope passing through ZB2 with a 45° line tangent to the vertex of the hyperbola as illustrated in FIG. 3, since in this case, at the new point P' the countdown rate would change from the rate $f0$ to the rate $\frac{1}{2} f0$. Using the same method as illustrated in connection with FIG. 3, additional tangents may be made tangent to the hyperbola H2 at points between ZB2 and ZB3, for example such that the slope of these additional tangents correspond to the counting rates $\frac{3}{4} f0$ and $\frac{2}{3} f0$, and the count values for these intersection points which should trigger the change in counting rates can be calculated likewise in the manner explained in connection with FIG. 3.

Figure 4:
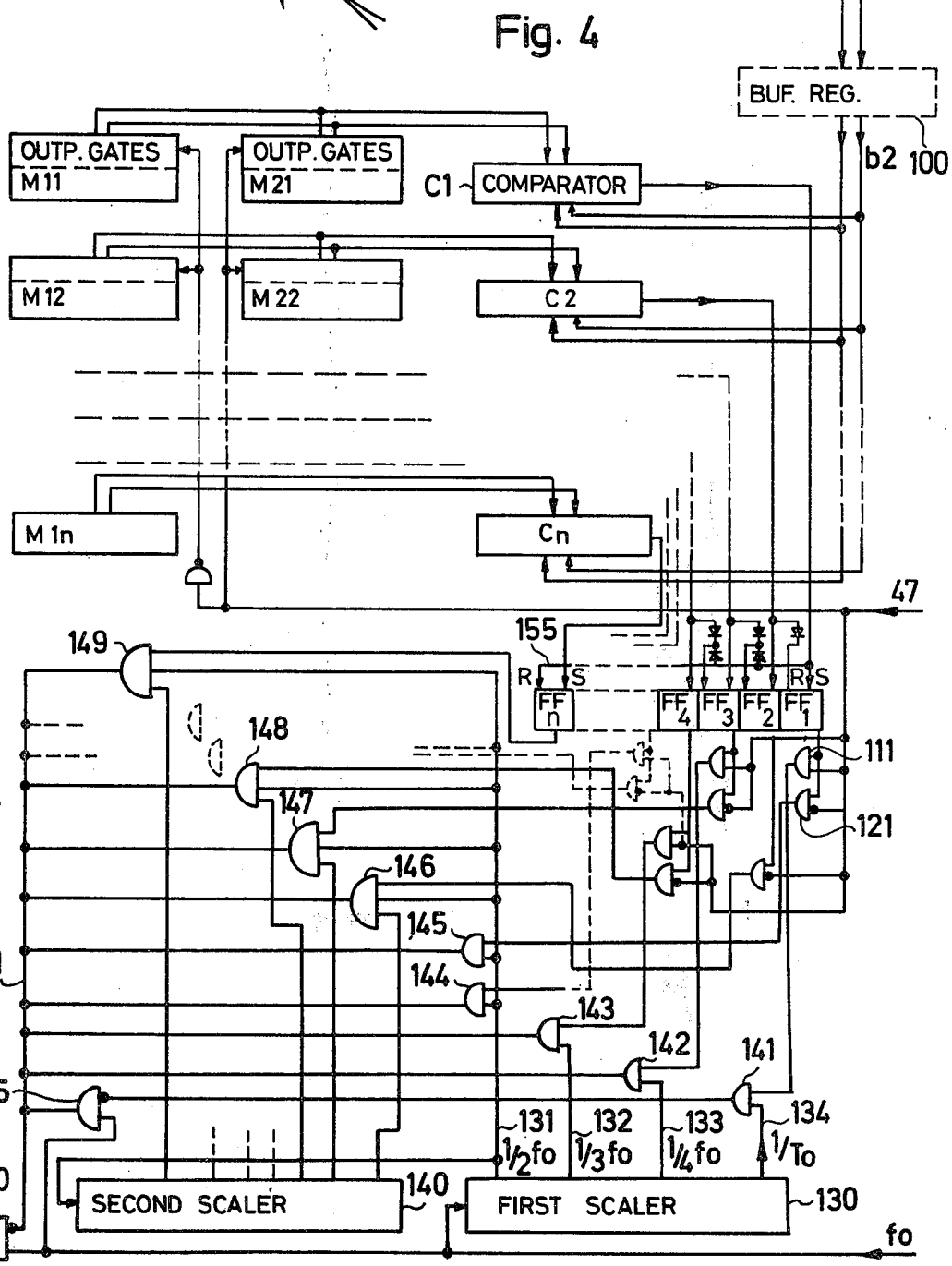
FIG. 4 is a diagram of one form in which the decoder 46 and multiplier 50 of the circuit of FIG. 2 may be constituted.

FIG. 4 shows the basic circuit diagram one form in which the decoder 46 may be constituted in order to function in accordance with the principle above explained.

The signals b2 from the output 45 (FIG. 2) of the counter 40 are supplied in parallel to an array of comparators C1,C2,C3 . . . Cn (FIG. 4), this being done either directly or through a buffer register 100. The comparators C1,C2,C3 . . . Cn are respectively supplied second inputs which represent predetermined reference values of the count variable Z at which a new count rate is to be demanded from the multiplier part of the circuit. This second set of inputs for the comparators comes from one of two arrays of fixed memories, one array corresponding to hyperbola H1 and the other corresponding to hyperbola H2. These memories are selectively connected to the corresponding comparators through activating output gates built into the memories in response to the input 47, which activates the gates of the memories M11,M12,M13 . . . when the MSB at output 34 of register 30 is 0 and activates instead the memories M21,M22,M23 . . . when the MSB is 1 at output 34 of register 30 of FIG. 2. The last comparator C is shown as connected only to the memory $M_{1n}$ of the MSB=0 series to indicate that reference values of Z well below ½ Zmax are of interest only in connection with the hyperbola H1.

The outputs of the comparators C1,C2,C3 . . . Cn are supplied to an array of flipflops FF1,FF2, FF3 . . . the noninverting outputs of which are supplied to the multiplier part of the FIG. 4 circuit. The operation of the counter 40 begins when it is reset to the appropriate Zmax value by its input 41 at the output 62 of the Zmax setter 60. The MSB signal on connection 47 connects the memory with the same Zmax number to the comparator C1, to provide a signal that verifies that the resetting of the counter 40 has been done and sets the flipflop FF1, which remains set until the comparator C2 gives an output signal.

The comparator C2 will similarly operate to set FF1 and reset FF2 signals when the counter 40 reaches a first rate change point, identified in the one of the memories M12 and M22 selected by reference to the input 47. The flipflop FF2 will remain set until the comparator C3 provides an output signal to set the flipflop FF3, which will occur at the predetermined value of Z for the next change in counting rate. When the count is stopped by flipflop 22 of FIG. 2 resetting the counter 40, comparator C1 operates again setting FF1 and at the same time resetting (clearing) all the other flip-flops FF2,FF3 . . . FFn through the connection 155.

The values representative of Zmax stored in memories M11 and M21 respectively may be adjusted to take account of the f0 pulse intervals elapsing between the loading of register 30 (FIG. 2) and the operation of comparator C1.

The outputs of the flipflops FF1,FF2,FF3, . . . FFn must be switched by the input 47 of the decoder, according to whether operation is on the hyperbola H1 or the hyperbola H2 before the decoding circuit can provide the necessary command to the multiplier circuit. This is shown by pairs of gates operated by the input 47 at the output of each of the flipflops. Thus, for the flipflop FF1, there are AND-gates 111 and 121, and a similar pair for each of the other flipflops. The gate corresponding to gate 111 is omitted for FF2 because the maximum counting rate f0 is desired for the condition in question and it is not then necessary to modify f0 by multiplication.

The multiplier circuit utilizes scalers 130 and 140 and an array of scaler output gates switched by the decoder outputs. Pulses of the frequency f0 are supplied to a scaling circuit 130, which provides pulses at various regular intervals in terms of number of periods of the frequency f0. Such a scaling circuit may be a chain of flipflops. A single chain of flipflops will do if they are desired for every second, third, eighth, sixteenth and so on pulses. On the other hand if for some counting rate changes it is desired to suppress every third, every fifth, every sixth, or every seventh, etc., pulses, two or more separate chains of flipflops may be necessary, as the case may be. A variety of outputs are made available from the scaling circuit as described below. For example, the output 131 may give a pulse on every second f0 pulse, the output 132 on every third pulse, the output 133 on every fourth pulse, the output 134 one pulse after the number of pulses of the frequency f0 such that only one or just a few pulses are produced during the count period T0, the last coming at the end of the period T0. This output is supplied to gate 135 which has f0 as its other input, so that all f0 pulses will be suppressed at gate 150 except when a pulse comes from output 134 of scaler 130, assuming gate 141 is enabled by gate 111. In this manner the initial counting rate for approach to hyperbola H2 can be made to count down from the value Zmax in memory M22 to that in memory M21 by the end of the period T0, so that the maximum counting rate f0 can then be exactly twice the initial counting rate for the line Zmax–S1 of FIG. 1.

A second scaling circuit 140 has its input provided on the output 131 of the scaling circuit 130. This is used for the slower rates of count involved at count values well below Zmax.

The outputs of the scaling circuits are provided to gates 141,142,143 . . . 149 and others indicated in dashed lines between the gates 148 and 149, all controlled by the flipflops FF1,FF2, . . . FFn through their respective output gates 111, 121, etc. previously mentioned.

The gate 150 permits the pulses of frequency f0 to go out on the output line 54 except when they are blocked by the simultaneous presence of a pulse on the conductor 151. The counting rate is accordingly reduced in proportion to the number of the pulses of frequency f0 that are blocked at the gate 150.

It will be understood that other forms of decoders and multipliers may be used and also that modifications on the system of FIG. 4 may be made. For example, the circuit may be simplified by omitting comparator C1 and memories M11 and M21, using the same value of Zmax for both hyperbolae and a single countdown pulse for the period T0 at output 134 of counter 130 and having FF1 controlled by a pulse from gate 20 or from flipflop 22.

Although the invention has been described with reference to a particular embodiment, it will be understood that variations are possible within the inventive concept.

We claim:

1. Circuit for converting a frequency into a binary number in response to a sequence of pulses of said frequency and to a sequence of clock pulses of a much higher frequency comprising:
   downward binary number counting means (40) arranged to be initially set and reset at a maximum count number by a reset signal and to count downwards from said number in response to counting pulses;
   count timing means responsive to said clock pulses for providing said counting means a count-versus-time characteristic that is substantially hyperbolic for a predetermined period of its downcounting operation, said count timing means being dependent on the momentary count output of said counting means and including
   decoding means (46) for detecting the values of count at which the counting rate should be reduced by a predetermined amount for provision of said hyperbolic characteristic and for generating a modifying signal determining a factor by which the frequency of said clock pulses is reducible;
   multiplying means (50) for reducing the frequency of said clock pulses by said factor in response to said clock pulses and said modifying signal and for producing counting pulses for said counting means;
   registering means (30) for receiving the momentary count value in said counting means after counting down from said maximum count number for a predetermined integral number of periods of said frequency to be measured and for holding said count value for readout thereafter for at least one period of said frequency to be measured, and
   resetting means (22) for providing a reset signal to said counting means after a count value is received as aforesaid by said registering means.

2. Circuit for converting a frequency into a binary number as defined in claim 1, in which said predetermined periods of said frequency to be measured in initially 1, and in which there are provided:
   scale shift means responsive to receipt by said registering means of a count value of at least half of said maximum count number for changing said predetermined number of periods to 2 for the next countdown from said maximum operation, said scale shift means also including means for modifying the operating characteristic of said decoding means to provide a different set of count values at which said decoding means is operable to change the counting rate of said counting means, and a different set of frequency reducing factors for said modifying signals by which said counting rate is changed.

3. Circuit for converting a frequency into a binary number as defined in claim 2, in which said scale shift means also includes means for changing said maximum count number for a succeeding count when said scale shift means operates to change said predetermined number of periods as aforesaid.

4. Circuit for converting a frequency into a binary number as defined in claim 1, in which means are provided for causing said registering means to receive the count value in said counting means upon the occurrence of the next clock pulse following a pulse of said frequency ($f1$) to be converted and for resetting said counting means upon the occurrence of the clock pulse next following the last previously mentioned clock pulse.

5. Circuit for converting a frequency into a binary number as defined in claim 2, in which said scale shift means comprises:
   a first AND-gate (12) having a first input (11) arranged to receive pulses of said frequency ($f1$) to be measured;
   a second AND-gate (15) having a first input (14) likewise arranged to receive pulses of said frequency ($f1$) to be measured;
   a J-K flipflop circuit (18) having its K input connected to receive pulses of said frequency ($f1$) to be measured and having its J input connected to the output of said second AND-gate (15) and its timing input connected to said clock frequency ($f0$) pulses, and also having its inverting output connected to a second input of said first AND-gate (12);
   the output ($f2$) of said first AND-gate (12) being made available as a timing signal to said registering means (30) for causing the latter to receive the momentary count of said downward counter (40), and
   a second input (16) of said second AND-gate (15) being connected to receive the most significant bit (MSB) of said registering means (30).

6. Circuit for converting a frequency into a binary number as set forth in claim 5, in which said output signal ($f2$) of said first AND-gate (12) is supplied to a D flipflop circuit arranged to operate in synchronism with said first mentioned clock frequency ($f0$) and having an output connected to a reset input (41) of said downward counting means (40).

7. Circuit for converting a frequency into a binary number as set forth in claim 5, in which the value of the most significant bit of said register (30) is made available to the portion of said scale shift means affecting said decoding means (46).

8. Circuit for converting a frequency into a binary number as set forth in claim 1, in which the value of the most significant bit of said binary count output is supplied to the portion (60) of said scale shift means affecting the value of said maximum count number reset in said downward counting means (40).

* * * * *